(12) United States Patent
Krishnaswamy et al.

(10) Patent No.: US 7,574,419 B2
(45) Date of Patent: Aug. 11, 2009

(54) AUTOMATIC TUNING OF UNDO RETENTION

(75) Inventors: Vasudha Krishnaswamy, Fremont, CA (US); Amit Ganesh, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 343 days.

(21) Appl. No.: 10/846,099

(22) Filed: May 13, 2004

(65) Prior Publication Data

US 2005/0256849 A1 Nov. 17, 2005

(51) Int. Cl.
*G06F 17/30* (2006.01)
(52) U.S. Cl. .................. 707/1; 707/3; 707/4; 707/5
(58) Field of Classification Search .............. 707/4, 707/202, 204
See application file for complete search history.

(56) References Cited

U.S. PATENT DOCUMENTS

| | | | | |
|---|---|---|---|---|
| 5,907,848 | A | * | 5/1999 | Zaiken et al. ............... 707/202 |
| 6,574,717 | B1 | * | 6/2003 | Ngai et al. .................. 711/147 |
| 6,587,847 | B1 | | 7/2003 | Stier et al. |
| 6,694,340 | B1 | * | 2/2004 | Lyle et al. .................. 707/204 |
| 6,976,022 | B2 | | 12/2005 | Vemuri et al. |
| 6,981,004 | B2 | | 12/2005 | Ganesh et al. |
| 7,047,386 | B1 | * | 5/2006 | Ngai et al. .................. 711/170 |
| 7,110,998 | B1 | * | 9/2006 | Bhandari et al. ............... 707/4 |
| 7,127,456 | B1 | | 10/2006 | Brown et al. |
| 2004/0054643 | A1 | | 3/2004 | Vemuri et al. |
| 2004/0054644 | A1 | | 3/2004 | Ganesh et al. |
| 2005/0015563 | A1 | | 1/2005 | Yang et al. |
| 2005/0114409 | A1 | | 5/2005 | Sinha et al. |
| 2005/0120062 | A1 | | 6/2005 | Sinha et al. |
| 2005/0120064 | A1 | | 6/2005 | Sinha et al. |
| 2005/0125430 | A1 | | 6/2005 | Souder et al. |
| 2005/0240633 | A1 | | 10/2005 | Krishnaswamy et al. |
| 2005/0256829 | A1 | | 11/2005 | Yang et al. |
| 2007/0083488 | A1 | | 4/2007 | Krishnaswamy |
| 2007/0083566 | A1 | | 4/2007 | Krishnaswamy et al. |

OTHER PUBLICATIONS

Burke, M. "An Interval-Based Approach to Exhaustive and Incremental Interprocedural Data-Flow Analysis" ACM Transactions on Programming Languages and Systems, Jul. 1990, vol. 12, No. 3, pp. 341-395.

Chin, R.S. et al. "Distributed Object-Based Programming Systems" ACM Computing Surveys, Mar. 1991, vol. 23, No. 1, pp. 91-124.

Chiueh, T. et al. "Zodiac: A History-Based Interactive Video Authoring System" Proceedings of the 6th ACM International Conference on Multimedia (Multimedia '98), Bristol, UK, Sep. 1998, pp. 435-443.

(Continued)

*Primary Examiner*—Don Wong
*Assistant Examiner*—Sheree N Brown
(74) *Attorney, Agent, or Firm*—Vista IP Law Group, LLP.

(57) ABSTRACT

A method and apparatus for data recovery are disclosed. A plurality of queries executing in a database system are tracked. A query with a longest duration is selected and undo retention duration is calculated for supporting the longest query.

20 Claims, 8 Drawing Sheets

OTHER PUBLICATIONS

Hudson, S.E. et al. "Object-Oriented Database Support for Software Environments" Proceedings of the 1987 ACM SIGMOD International Conference on Management of Data (SIGMOD '87), San Francisco, CA, May 27-29, 1987, vol. 16, No. 3, pp. 491-503.

Kunz, T. et al. "Fast Detection of Communication Patterns in Distributed Executions" Proceedings of the 1997 Conference of the Centre for Advanced Studies on Collaborative Research, Nov. 1997, pp. 1-13.

Leehane, T. "Level II Technical Support in a Distributed Computing Environment" Proceedings of the 24th Annual ACM SIGUCCS Conference on User Services, Sep. 1996, pp. 95-99.

Lomet, D.B. "MLR: A Recovery Method for Multi-level Systems" Proceedings of the 1992 ACM SIGMOD International Conference on Management of Data (SIGMOD '92), San Diego, CA, Jun. 2-5, 1992, vol. 21, No. 2, pp. 185-194.

Randell, B. et al. "Reliability Issues in Computing System Design" ACM Computing Surveys, Jun. 1978, vol. 10, No. 2, pp. 123-165.

Santry, D.S et al. "Deciding when to forget in the Elephant file system" Proceedings of the 17th ACM Symposium on Operating Systems Principles (SOSP '99), Kiawah Island, SC, Dec. 1999, vol. 33, No. 5, pp. 110-123.

Soares, P.G. "On Remote Procedure Call" Proceedings of the 1992 Conference of the Centre for Advanced Studies on Collaborative Research, Nov. 1992, vol. 2, pp. 215-267.

Thatte, S.M. "Persistent Memory: A Storage Architecture for Object-Oriented Database Systems" Proceedings on the 1986 International Workshop on Object-Oriented Database Systems, Sep. 1986, pp. 148-159.

* cited by examiner

| Length of longest query | Undo Records | Current undo retention table size | Current undo retention time |
|---|---|---|---|
|  |  |  |  |

FIG. 2

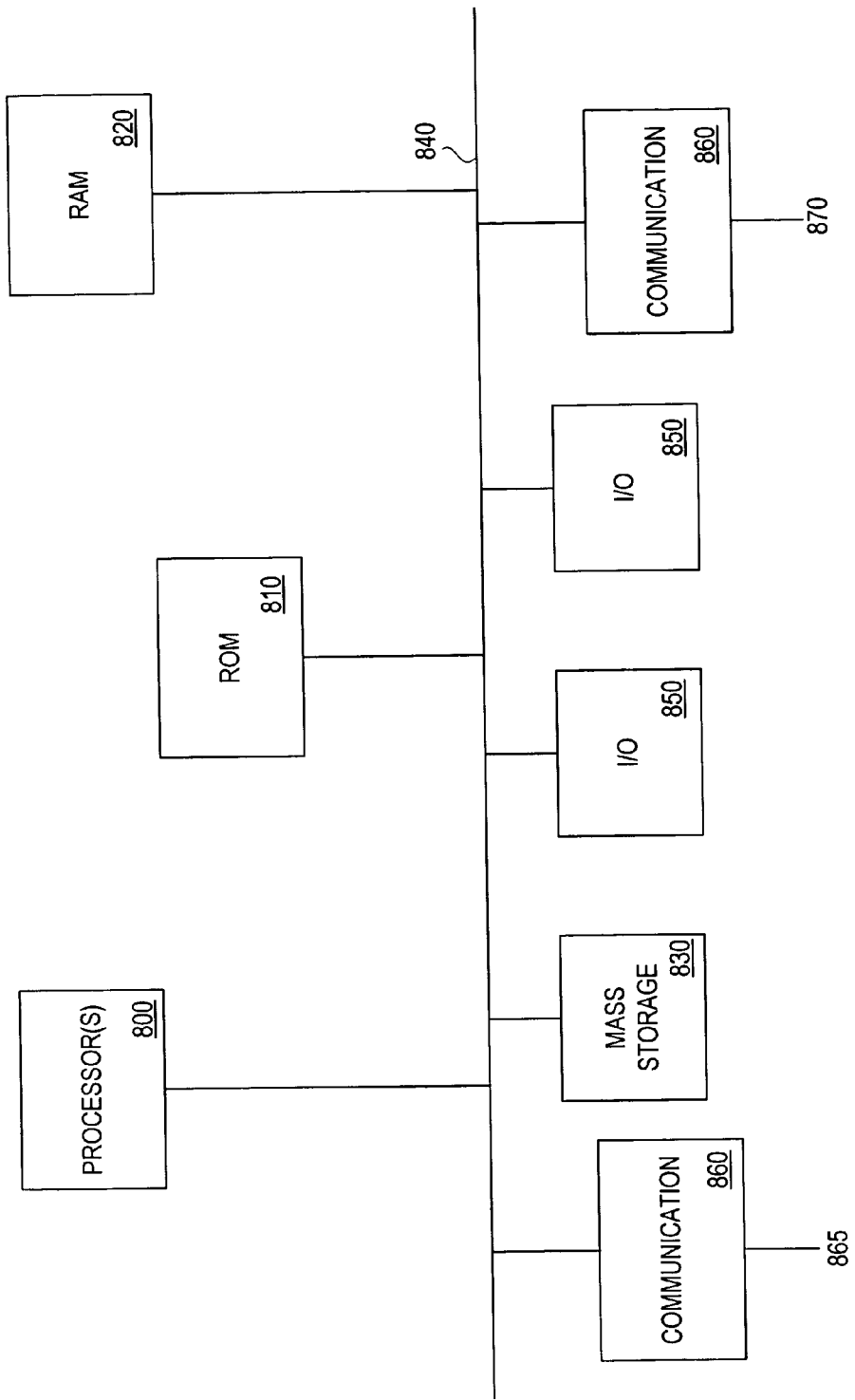

AUTOMATIC TUNING OF UNDO RETENTION

FIELD

Embodiments of the invention relate to computer systems, and more particularly to data recovery.

BACKGROUND OF THE INVENTION

In database systems, a "transaction" refers to an atomic set of operations performed against a database, which may access, create, modify or delete database data or metadata. A "commit" occurs when the transaction has completed its processing and any changes to the database by the transaction are ready to be permanently implemented in the database system.

Transaction log records can be maintained in a database system to allow data recovery in the event of an error, that may include hardware failure, network failure, process failure, database instance failure, data access conflicts, user errors, and statement failures in database access programs.

Various types of transaction log records can be maintained in a database system for data recovery. One type of log record that may be maintained is the "undo" record. Undo records contain information about changes that were introduced into the database system. For example, if a row in a table was modified, the changes will be stored in the undo record identifying the block of the database system that includes the modified table row.

Memory or disk space needs to be allocated for storage of undo records. Database managers usually set the undo tablespace size by predicting how much undo records may be generated. Often there is not enough statistical information available for database administrators to use in order to arrive at an accurate prediction of undo records generation. Incorrect undo tablespace size may cause errors in the system, as not enough undo records may be available. Alternatively, allocating too much memory or disk space for storing undo records is inefficient.

Moreover, database administrators need to predict how many undo records need to be maintained. Database system activity levels may fluctuate, for example during regular business hours activity levels may be higher than at night. Not only predicting how many undo records need to be maintained is difficult since database administrators do not have access to a lot of statistical information, changing that parameter as system activity levels change becomes almost impossible, as it requires someone to constantly monitor system activity and change the parameter as needed.

What is needed, therefore, is a solution that overcomes these and other shortcomings of the prior art.

SUMMARY OF THE INVENTION

Method and apparatuses for data recovery are described. Embodiments of the invention include tracking a plurality of queries executing in a database system. Embodiments further include selecting a query with a longest duration and calculating undo retention duration of the system for supporting the longest query.

BRIEF DESCRIPTION OF THE DRAWINGS

The invention is illustrated by way of example and not limitation in the figures of the accompanying drawings, in which like references indicate similar elements and in which:

FIG. 2 illustrates an exemplary structure of a statistics table according to one embodiment of the invention;

FIG. 8 illustrates a conventional processing system.

DETAILED DESCRIPTION

Methods and apparatuses for data recovery are described. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those skilled in the art. Thus, the invention can include any variety of combinations and/or integrations of the embodiments described herein.

Figure 1:
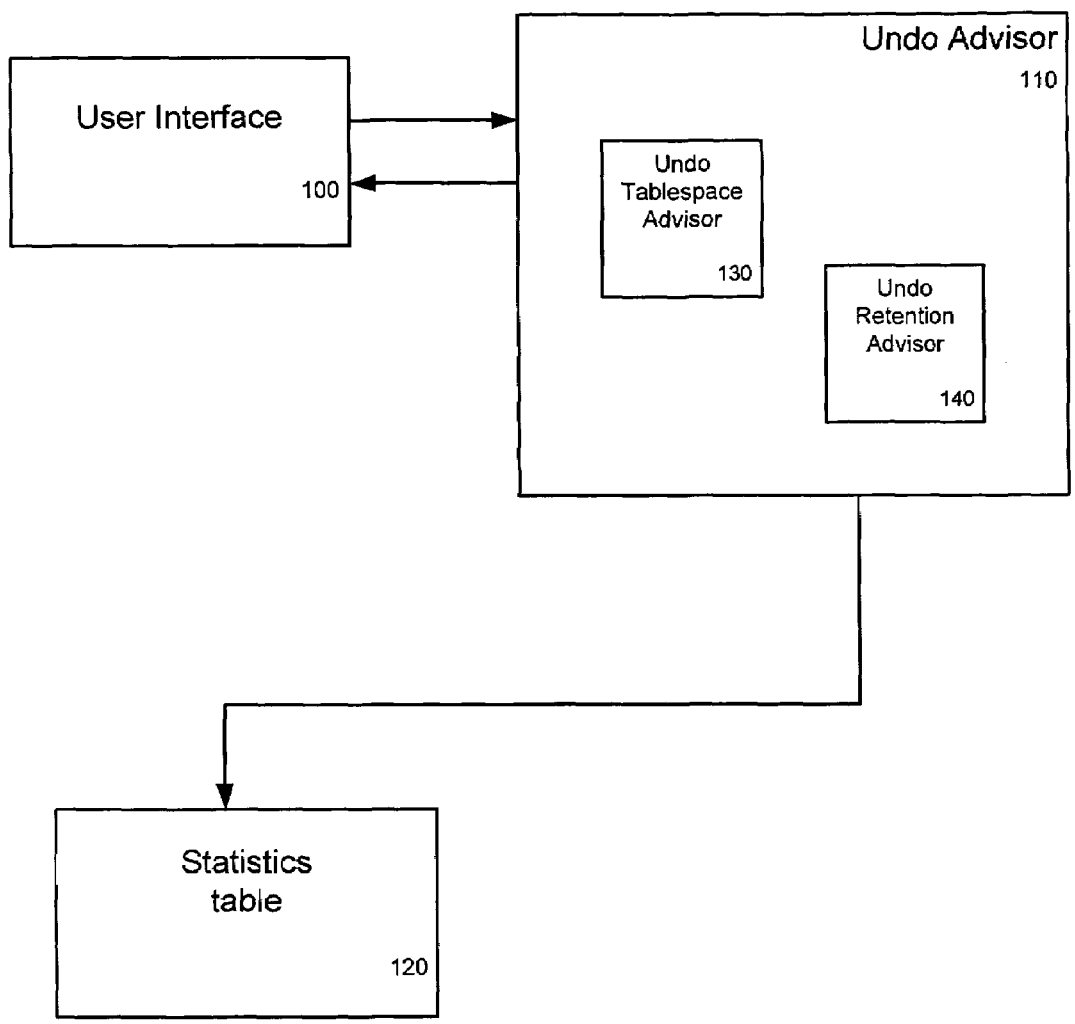
FIG. 1 illustrates an exemplary system architecture according to one embodiment of the invention.

In one embodiment of the invention, a user of a database system requests via a user interface 100 of FIG. 1, recommendations for the size of an undo tablespace and the length of time during which undo records should be available. Undo retention refers to how long database management systems maintain undo records. In response to the request, undo advisor 110, utilizing a statistics table 120, provides the requested recommendations. The statistics table 120 includes information about used undo records and the length of the longest running query per a particular time period, for example, 10 minutes. The statistics table 120 may also include other information, some of which is reflected in FIG. 2. It will be appreciated that the structure of the statistics table is not limited to the one described herein and illustrated in FIG. 2 and other structures and formats may be utilized without departing from the scope of the invention.

Undo Retention Tablespace Size Recommendation

Figure 3:
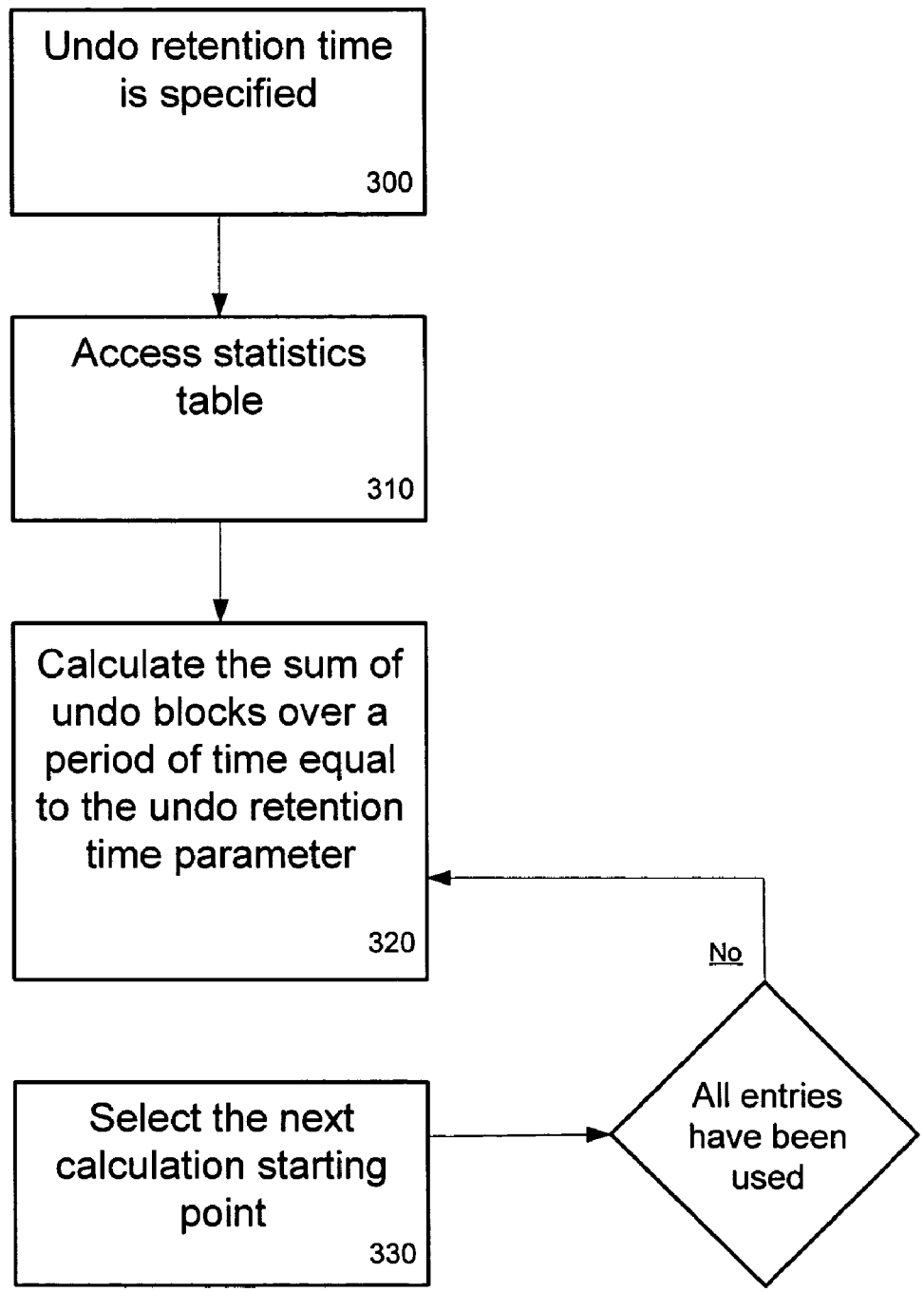
FIG. 3 is a flow diagram of a recommendation of undo tablespace size process according to one embodiment of the invention.

In one embodiment of the invention, at 300 of FIG. 3 a user specifies the desired undo retention time, for example 3 hours, to ensure that data can always be recovered to a state as of 3 hours prior to current time. The user then requests a recommendation of an undo tablespace size large enough to store data necessary for data recovery for a period of the desired undo retention time, e.g., 3 hours. In one embodiment, the user also specifies time period of system level activity to use in the recommendation calculations. Thus, the user may request undo tablespace size recommendation for storing 3 hours worth of undo records based on system level activity of the past 3 days, i.e. a history time parameter.

In response to the user's request, at 310 the undo tablespace size advisor 130 accesses the statistics table 120 to perform necessary calculations using the user-specified history time parameter. In one embodiment if the user does not specify the history time parameter, the undo tablespace size advisor 130 retrieves statistics information collected over the past seven days, otherwise the undo tablespace size advisor 130 retrieves statistics information collected over a period of time specified by the history time parameter.

At 320 the undo tablespace size advisor calculates the sum of undo blocks generated over a period of time equal to the user-specified undo retention time parameter starting with the most recent statistics interval. A statistics interval is a period of time associated with each statistics table entry. For example, if statistics interval is 10 minutes, then each statistics table entry includes an average of data collected over a 10 minute interval, and a set of statistics table entries includes statistics data collected over a number of consecutive 10 minute intervals. Thus, if the undo retention time parameter is 3 hours, then the undo tablespace size advisor 130 calculates the amount of undo tablespace size that is necessary to store the undo blocks generated over the 3 hour period by calculating the sum of undo retention blocks entries in the statistics table starting with the most recent entry in the statistics table and ending with the statistics table entry recorded 3 hours prior to the most recent one.

Upon storing the result of the summation operation, at 330 the undo tablespace size advisor 130 performs the same summation operation starting with the second most recent entry in the statistics table and ending with the entry recorded 3 hours prior to the second most recent one. Upon storing the result of this second summation operation, the undo tablespace size advisor 130 performs the same operation starting with the third most recent entry in the table and so on, until all entries recorded during a time interval equal to the history time parameter have been used in the calculations. For example, continuing with the example introduced above, if the history time parameter was specified to be 3 days, then the undo advisor performs summation operations until all statistics entries recorded in the last three days have been used.

It will be appreciated that the undo retention time and history time parameters may be specified to any value and the values of 3 hours and 3 days were used for exemplary purposes only in order to facilitate understanding of the invention.

Figure 4:
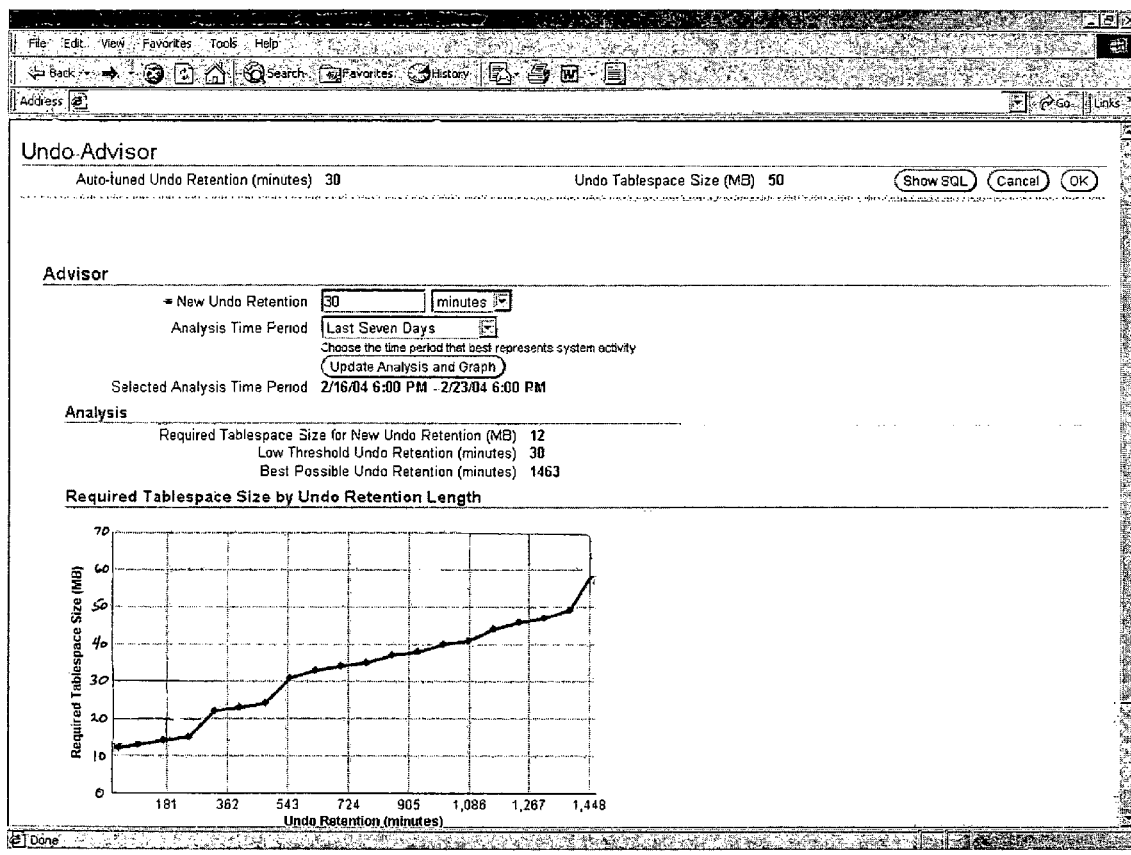
FIG. 4 illustrates an exemplary graphical user interface according to one embodiment of the invention.

In one embodiment of the invention, the undo tablespace size advisor selects the maximum sum from all the summation results and provides the user with the recommendation to set the undo tablespace size to the value of the maximum sum. In alternative embodiment, the undo tablespace size advisor provides the user with the recommendation to set the undo tablespace size to the value of 110% of the maximum sum. In one embodiment, the undo tablespace size advisor provides the user with the recommendation to set the undo tablespace size to the value of the average of all the sums. In one embodiment, the recommended undo tablespace size is presented to the user via a graphical user interface, an example of which is illustrated in FIG. 4

In one embodiment, upon acceptance of the recommendation by the user, the undo tablespace size is set to the recommended value.

Best Possible Undo Retention Indication

Figure 5:
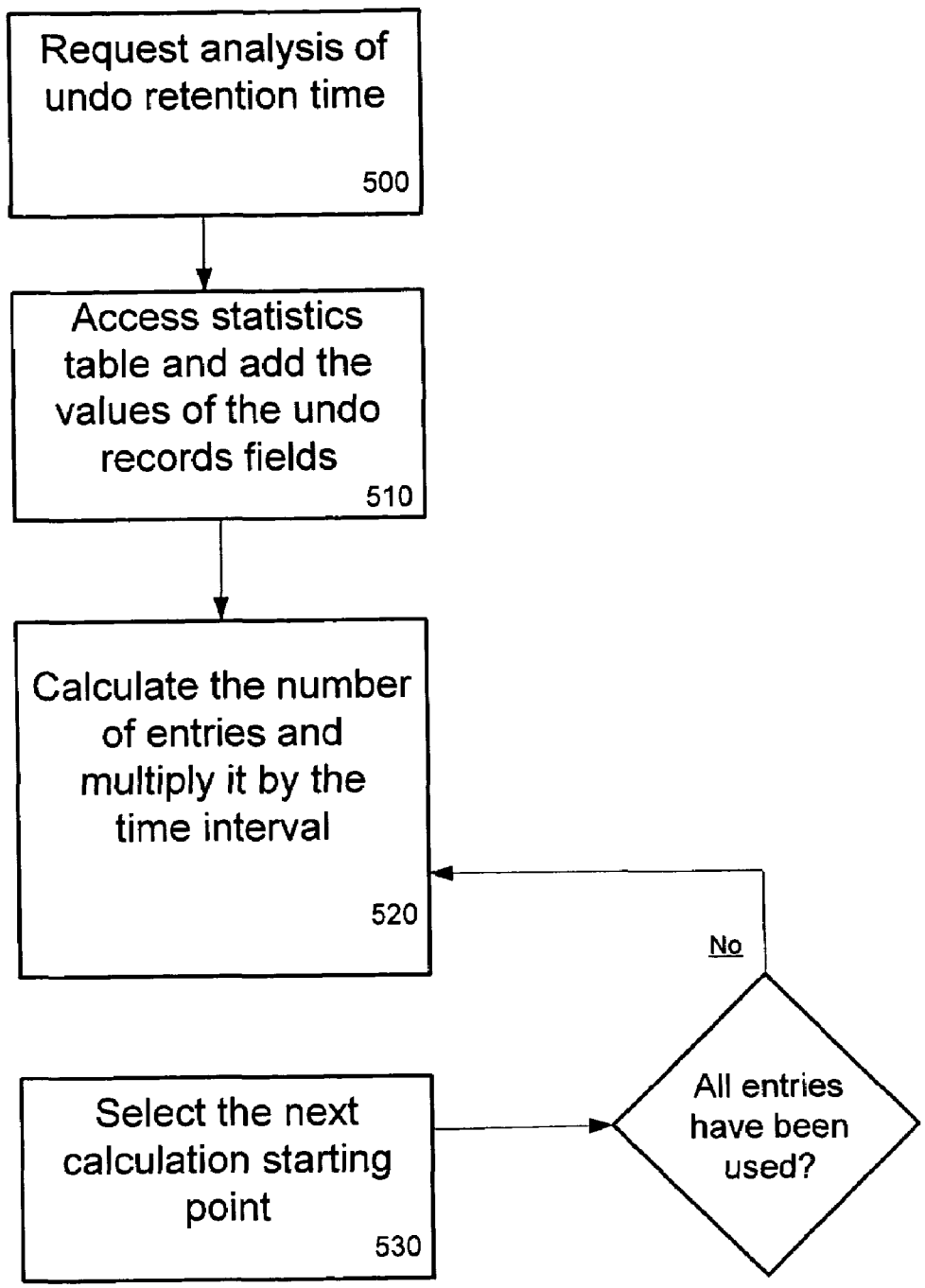
FIG. 5 is a flow diagram of a recommendation of best undo retention process according to one embodiment of the invention.

In one embodiment of the invention, at 500 of FIG. 5 the user requests an indication of the best possible undo retention time given a particular fixed size of the undo tablespace and based on system activity level during a user-specified history time. For example, the user may request an analysis of the best possible retention time for a database system with a fixed undo tablespace size of 2 MB considering system level activity of the past three days. In response to the request, the undo retention advisor determines how long it takes to fill up the fixed size undo tablespace based on historical system data retrieved from the statistics table. At 510 the undo retention advisor 140 accesses the statistics table 120 and adds the values of the undo records fields of the statistics table starting with the most recent statistics table entry until the addition of the next value of the undo records field will cause the total sum to be greater than the fixed undo tablespace size. For example, if undo tablespace size is 2 MB, then the undo retention advisor 140 performs summation calculations until addition of the next value will cause the summation result to be greater than 2 MB. Once the summation operation is finished, at 520 the undo retention advisor 140 calculates the number of entries that were accessed and multiplies it by the time interval value associated with each entry. For example, if each entry in the statistics table is associated with a 10 minutes interval, and it took 3 undo blocks entries to calculate a sum that is equal to or almost equal to the value of the undo tablespace size, then during this 30 minutes interval, i.e. generation time, the activity of the database system generated undo blocks equal to or almost equal to the value of the undo tablespace size.

In one embodiment, at 530 upon storing the calculated length of time during which the system generated undo retention blocks that would fill up the current undo tablespace size, the undo retention advisor 140 performs the same calculation operation starting with the second most recent entry in the statistics table and so on, until all the entries recorded during the specified history time have been used.

In one embodiment, the undo retention advisor 140 provides the user with the recommendation to set the best undo retention time parameter to the minimum value from the plurality of generation time parameters. In another embodiment, the undo retention advisor provides the user with the recommendation to set the best undo retention time parameter to the value equal to 90% of the minimum value of the plurality of generation time parameters. In yet another embodiment, the undo retention advisor provides the user with the recommendation to set the best undo retention time parameter to the average of the values of the plurality of generation time parameters.

In one embodiment, the best undo retention indication is presented to the user via a graphical user interface, an example of which is illustrated in FIG. 4.

Auto-Tuning of Undo Retention

Undo retention records are not only used to recover data, but also to ensure successful execution of database queries. In one embodiment of the invention, every query is associated with a timestamp indicating system time at which the query was issued. In order for the query to succeed, the state of the database objects that the query accesses has to be available as of the query timestamp. For example, if the query was issued at 2 p.m., and it accesses Table 1 and Table 2, the state of Table 1 and Table 2 as of 2 p.m., or the as of the system time associated with 2 p.m., needs to be available for the query to succeed. Thus, the changes that are made to Table 1 and Table 2 since the issuance of the query and stored in associated undo records need to be available in the system for the duration of the query to allow recovery of the database objects states as of the query issuance time when the query accesses the database objects, e.g. Table 1 and Table 2.

In one embodiment of the invention, the undo retention parameter is automatically set based on the length of the longest running query in the system. In addition, the undo retention parameter is dynamically auto-tuned based on system activity.

Figure 6:
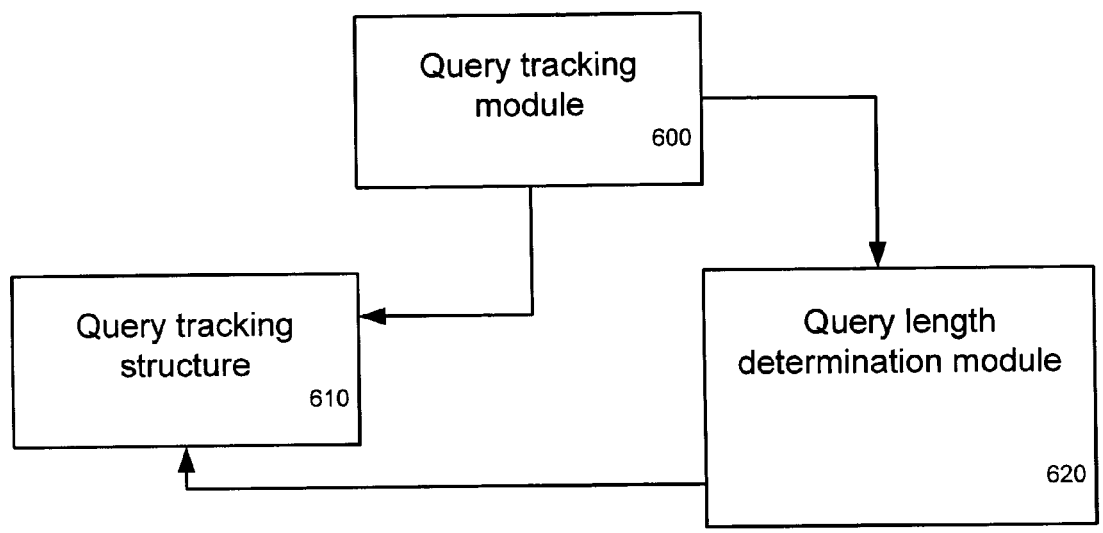
FIG. 6 illustrates is an exemplary system architecture according to one embodiment of the invention.
Figure 7:
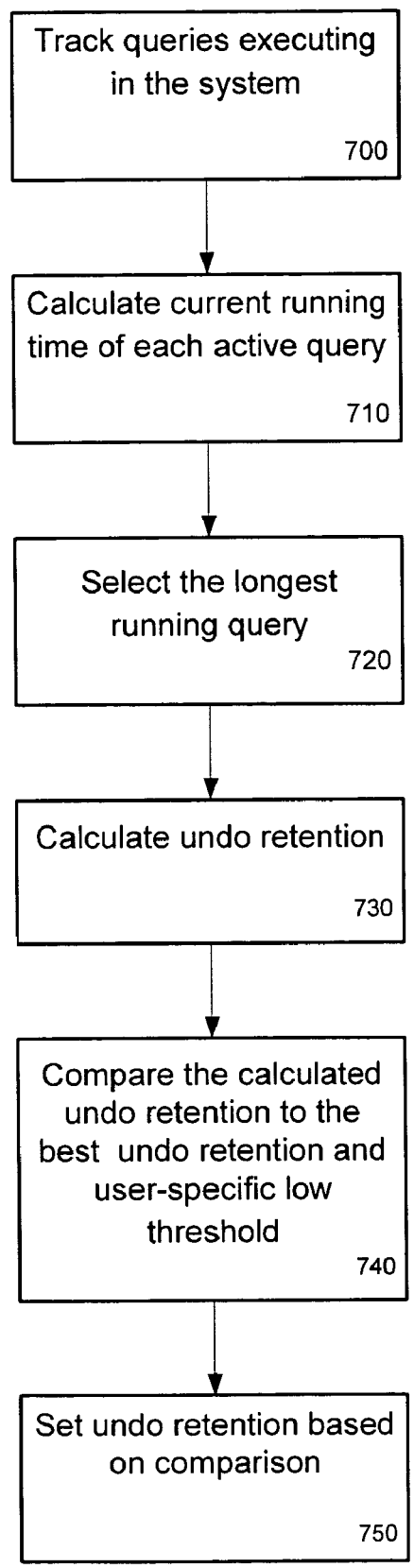
FIG. 7 is a flow diagram of automatic tuning of undo retention process according to one embodiment of the invention.

Embodiments are described further with references to FIG. 7. At 700 a query tracking module 600 of FIG. 6 tracks queries executing in the system to determine the length of the longest running query. The query tracking module 600 periodically examines a cursor associated with each query and tracks the duration and activity of each cursor. Cursors are well-known in the art and no detailed explanation of cursors and their functions is necessary. In one embodiment, only active queries are tracked. In one embodiment, the user may set a query expiration time parameter to specify that if a query is idle for the duration of the query expiration time parameter, then that query is inactive and should not be tracked anymore. For example, if for the last 10 minutes there was no activity associated on a cursor of a particular query, the query tracking module 600 stops tracking that query as it is considered to be inactive. It will be appreciated by one skilled in the art that the user may set the query expiration parameter to any value and the invention is not limited to 10 minutes interval of the above example.

In one embodiment, the query is inactive if it does not access consistent read blocks associated with it. Consistent read blocks include database objects that the query accesses in the state as of the query timestamp.

In one embodiment, the query tracking module 600 maintains a query tracking data structure 610, for example, a table, in which a start time is recorded for each query. Alternatively, the start time may be recorded in the cursor of the query. This start time is then utilized by the query tracking module 600 to calculate the longest running query.

In one embodiment, at 710 the query tracking module 600 periodically, for example, every 1 minute, calculates current running time of each active query by comparing the timestamp of the query stored in the query tracking structure 610 with the current system time. Then, at 720, the query tracking module 600 selects the longest query duration and computes the required undo retention duration necessary to support this longest running query at 730 by adding to the query length a safety parameter which includes the time period and latency in the startup of the tuning process. For example, if the tuning time period is 1 minute and the latency of the startup of the tuning process is 1.5 minutes, then the safety parameter is (1.5*time period). Thus, the required undo retention duration is equal to > tracked query length+safety parameter.

For example, if the time period is 1 minute and the current longest query length is 30 minutes, then the required undo retention is 45 minutes.

In one embodiment, when the auto tuning of undo retention is performed in a cluster, the longest query duration is determined based on the longest query over all the instances in the cluster.

In one embodiment, at 740, a query length determination module 620 compares the required undo retention duration to the best undo retention and to the user-specified undo retention parameter. In one embodiment, the user may specify the low threshold of undo retention and the tuning process described above tunes the retention above this low threshold as long as the undo tablespace supports such retention. At 750 based on comparison results the query length determination module 620 directs the system to set system's undo retention. For example, if the required undo retention duration is less than the best possible, which in turn is less than the user-specified low threshold, then the query length determination module 620 directs the system to set the system's undo retention to the best possible retention. If the required undo retention is less than user-specified low threshold, which is in turn less than best possible retention, then the query length determination module 620 directs the system to set undo retention to user-specified low threshold undo retention. If the required undo retention duration is less than the best possible retention but greater than the user-specified low threshold, then the query length determination module 620 directs the system to set the system's undo retention to the calculated undo retention value. Generation of undo retention records cannot exceed the size of the undo tablespace, and thus, the system sets the undo retention of the system to the value of the best undo retention (or to the value of the user-specified low threshold if retention guarantee feature is invoked, as described below), if the calculated undo retention duration value is greater than the best undo retention and greater than the user-specified low threshold. In addition, if the required undo retention is greater than the value of the best undo retention, which in turn is greater than the value of the user-specified low threshold, then the query length determination module directs the system to set the undo retention to the best possible retention. If the user-specified low threshold is greater than the required undo retention, which in turn is greater than the best possible retention, then the query length determination module 620 directs the system to set the system's undo retention to best possible retention. In this situation, the longest running query may fail due to lack of necessary undo records.

In one embodiment of the invention, the user may invoke retention guarantee feature, wherein the system sets undo retention to the low threshold, even if best possible undo retention is less than the user-specified low threshold. Thus, if the user-specified low threshold is greater than the required undo retention, which in turn is greater than the best possible retention, then the query length determination module 620 directs the system to set the system's undo retention to user-specified low threshold, if the user invoked the retention guarantee feature. If the user did not invoke the retention guarantee feature, then the system's retention is set to best possible retention.

General

It will be appreciated that physical processing systems, which embody components of database system described above, may include processing systems such as conventional personal computers (PCs), embedded computing systems and/or server-class computer systems according to one embodiment of the invention. FIG. 8 illustrates an example of such a processing system at a high level. The processing system of FIG. 8 may include one or more processors 800, read-only memory (ROM) 810, random access memory (RAM) 820, and a mass storage device 830 coupled to each other on a bus system 840. The bus system 840 may include one or more buses connected to each other through various bridges, controllers and/or adapters, which are well known in the art. For example, the bus system 840 may include a 'system bus', which may be connected through an adapter to one or more expansion buses, such as a peripheral component interconnect (PCI) bus or an extended industry standard architecture (EISA) bus. Also coupled to the bus system 840 may be the mass storage device 830, one or more input/output (I/O) devices 850 and one or more data communication devices 860 to communicate with remote processing systems via one or more communication links 865 and 870, respectively. The I/O devices 850 may include, for example, any one or more of: a display device, a keyboard, a pointing device (e.g., mouse, touch pad, trackball), and an audio speaker.

The processor(s) 800 may include one or more conventional general-purpose or special-purpose programmable microprocessors, digital signal processors (DSPs), application specific integrated circuits (ASICs), or programmable logic devices (PLD), or a combination of such devices. The mass storage device 830 may include any one or more devices suitable for storing large volumes of data in a non-volatile manner, such as magnetic disk or tape, magneto-optical storage device, or any of various types of Digital Video Disk (DVD) or Compact Disk (CD) based storage or a combination of such devices.

The data communication device(s) 860 each may be any device suitable to enable the processing system to communicate data with a remote processing system over a data communication link, such as a wireless transceiver or a conventional telephone modem, a wireless modem, an Integrated Services Digital Network (ISDN) adapter, a Digital Subscriber Line (DSL) modem, a cable modem, a satellite transceiver, an Ethernet adapter, Internal data bus, or the like.

The term "computer readable medium", as used herein, refers to any medium that provides information or is usable by the processor(s). Such a medium may take many forms, including, but not limited to and non-volatile media. Non-volatile media, i.e., media that can retain information in the absence of power, includes ROM, CD ROM, magnetic tape and magnetic discs. Volatile media, i.e., media that cannot retain information in the absence of power, includes main memory.

Thus, methods and apparatuses for data recovery in database systems have been described. Although the invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

The invention claimed:

1. A method, comprising:
   tracking a plurality of queries executing in a database system;
   selecting a query with a longest duration;
   determining an undo retention duration of the database system for supporting the longest query by examining a required undo retention time and a possible undo retention time, wherein
   the required undo retention time comprises a length of the longest query and a safety parameter which is determined by considering at least a time period of a query tuning process and latency in startup of the query tuning process.
   the act of determining the undo retention duration of the database system determines the undo retention duration to be a calculated retention time required to fill up a tablespace if the required retention time is determined to be less than the possible retention time; and
   displaying a result of the action of determining the undo retention duration on a display apparatus or storing the result in a tangible volatile or non-volatile computer readable medium or a storage device.

2. The method of claim 1 wherein the plurality of queries includes active queries.

3. The method of claim 1 further comprising setting system's undo retention to the calculated undo retention duration.

4. The method of claim 1 further comprising comparing the calculated undo retention duration to best undo retention.

5. The method of claim 4 further comprising comparing the calculated undo retention duration to user-specified low-threshold.

6. The method of claim 5 further comprising setting system's undo retention to best possible retention if value of best possible retention is greater than value of the calculated undo retention duration, which is greater than the user-specified low threshold.

7. The method of claim 5 further comprising setting system's undo retention to user-specified low threshold if value of best possible retention is greater than value of user-specified low threshold, which his greater than value of calculated undo retention duration.

8. The method of claim 5 further comprising setting system's undo retention to best possible retention if value of the calculated undo retention duration is greater than value of the user-specified low threshold and value of best undo retention.

9. An apparatus comprising:
   a query tracking module to track a plurality of queries executing in a database system;
   a query length determination module to select a query with a longest duration and to determine a undo retention duration of the database system for supporting the longest query by examining a required undo retention time and a possible undo retention time, wherein
   the required undo retention time comprises a length of the query with the longest duration and a safety parameter which is determined by considering at least a time period of a query tuning process and latency in startup of the query tuning process.
   the act of determining the undo retention duration of the database system determines the undo retention duration to be a calculated retention time required to fill un a tablespace if the required retention time is determined to be less than the possible retention time; and
   a display apparatus configured for displaying the undo retention duration of the database system or a tangible volatile or non-volatile computer readable medium or a storage device configured for storing the calculated undo retention duration.

10. The apparatus of claim 9 wherein the query length determination module further to set system's undo retention to the calculated undo retention duration.

11. The apparatus of claim 9 wherein the query length determination module further to compare the calculated undo retention duration to best undo retention.

12. The apparatus of claim 9 wherein the query length determination module further to compare the calculated undo retention duration to user-specified low-threshold.

13. An article of manufacture comprising:
   a computer-readable volatile or non-volatile medium having stored therein instructions which, when executed by a processor, cause a processing system to perform a method comprising:
   tracking a plurality of queries executing in a database system;
   selecting a query with a longest duration;
   determining an undo retention duration of the database system for supporting the longest query by examining a required undo retention time and a possible undo retention time, wherein the required undo retention time comprises a length of the longest query and a safety parameter which is determined by considering at least a time period of a query tuning process and latency in startup of the query tuning process.
   the act of determining the undo retention duration of the database system determines the undo retention duration to be a calculated retention time required to fill up a tablespace if the required retention time is determined to be less than the possible retention time; and displaying a result of the action of determining a result of the action of determining the undo retention duration on a display apparatus or storing the result in a tangible volatile or non-volatile computer readable medium or a storage device.

14. The article of manufacture of claim 13 wherein the instructions, which when executed by the processor, cause the processing system to perform the method further comprising comparing the calculated undo retention duration to best possible retention.

15. The article of manufacture of claim 14 wherein the instructions, which when executed by the processor, cause the processing system to perform the method further comprising comparing the calculated undo retention duration to user-specified low threshold.

16. The article of manufacture of claim 15 wherein the instructions, which when executed by the processor, cause the processing system to perform the method further comprising setting system's undo retention to best possible retention if value of best possible retention is greater than value of the calculated undo retention duration, which is greater than the user-specified low threshold.

17. The article of manufacture of claim 15 wherein the instructions, which when executed by the processor, cause the processing system to perform the method further comprising setting system's undo retention to user-specified low threshold if value of best possible retention is greater than value of user-specified low threshold, which is greater than value of calculated undo retention duration.

18. The method of claim 1 wherein the undo retention duration is stored in memory.

19. The apparatus of claim 9 wherein the undo retention duration is stored in memory.

20. The article of manufacture of claim 13 wherein the undo retention duration is stored in memory.

* * * * *

UNITED STATES PATENT AND TRADEMARK OFFICE
CERTIFICATE OF CORRECTION

| | | |
|---|---|---|
| PATENT NO. | : 7,574,419 B2 | Page 1 of 1 |
| APPLICATION NO. | : 10/846099 | |
| DATED | : August 11, 2009 | |
| INVENTOR(S) | : Vasudha Krishnaswamy | |

It is certified that error appears in the above-identified patent and that said Letters Patent is hereby corrected as shown below:

In column 3, line 53, after "FIG. 4" insert -- . --.

In column 7, line 20, delete "computer readable" and insert -- computer-readable --, therefor.

In column 7, line 51, in claim 1, delete "process." and insert -- process; --, therefor.

In column 8, line 12, in claim 7, delete "his" and insert -- is --, therefor.

In column 8, line 30, in claim 9, delete "process." and insert -- process; --, therefor.

In column 8, line 33, in claim 9, delete "un" and insert -- up --, therefor.

In column 8, line 65, in claim 13, delete "process." and insert -- process; --, therefor.

Signed and Sealed this

Third Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,574,419 B2
APPLICATION NO. : 10/846099
DATED : August 11, 2009
INVENTOR(S) : Krishnaswamy et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Seventh Day of September, 2010

David J. Kappos
*Director of the United States Patent and Trademark Office*